(12) United States Patent
Ellerbrock et al.

(10) Patent No.: US 7,346,719 B2
(45) Date of Patent: Mar. 18, 2008

(54) SYSTEMS, METHODS, AND BUS CONTROLLERS FOR CREATING AN EVENT TRIGGER ON A NETWORK BUS

(75) Inventors: Philip J. Ellerbrock, St. Peters, MO (US); Daniel W. Konz, Florissant, MO (US); Christian J. Noll, Maryland Heights, MO (US)

(73) Assignee: The Boeing Company, Seattle, WA (US)

( * ) Notice: Subject to any disclaimer, the term of this patent is extended or adjusted under 35 U.S.C. 154(b) by 420 days.

(21) Appl. No.: 10/475,454

(22) PCT Filed: Apr. 26, 2002

(86) PCT No.: PCT/US02/13303

§ 371 (c)(1),
(2), (4) Date: Oct. 21, 2003

(87) PCT Pub. No.: WO02/088966

PCT Pub. Date: Nov. 7, 2002

(65) Prior Publication Data
US 2004/0177206 A1   Sep. 9, 2004

(51) Int. Cl.
*G06F 13/00* (2006.01)
*G06F 3/00* (2006.01)

(52) U.S. Cl. .......................... 710/107; 710/3; 710/110; 710/56; 710/300; 340/541; 340/429; 340/932.2; 709/246

(58) Field of Classification Search ................ 710/266, 710/107

See application file for complete search history.

(56) References Cited

U.S. PATENT DOCUMENTS 4,124,778 A  11/1978 Amass (Continued)

FOREIGN PATENT DOCUMENTS

EP   0 449 458 A1   10/1991

(Continued)

OTHER PUBLICATIONS

PCI-to-PCI Bridge Architecture Specification Revision 1.1, Dec. 18, 1998—17 pages.*

(Continued)

*Primary Examiner*—Mark H. Rinehart
*Assistant Examiner*—Brian Misiura
(74) *Attorney, Agent, or Firm*—Alston & Bird LLP

(57) ABSTRACT

The present invention provides systems, methods, and bus controllers (12) for monitoring an event of interest via a network bus (14) and creating an asynchronous event trigger on the network bus indicating that the event occurred. Importantly, the systems, methods, and bus controllers (12) of the present invention use either one or several network devices (16, 18) that are connected to the network bus (14) and monitor the occurrence of an event of interest. These network devices (16, 18) are configure through commands from the bus controller (12) to indicate on the network bus (14) typically by a pulse signal, when the event of interest has occurred. The indication from the network device (16, 18) that the event has occurred is used by the bus controller (12) and other network devices (16, 18, 20) on the network bus (14) to configure timing for commands or to perform desired actions in synchronization with the occurrence of the event of interest.

21 Claims, 5 Drawing Sheets

U.S. PATENT DOCUMENTS

| | | | |
|---|---|---|---|
| 4,137,562 A | | 1/1979 | Boeck et al. |
| 4,241,416 A | * | 12/1980 | Tarczy-Hornoch ............ 714/47 |
| 4,304,001 A | | 12/1981 | Cope |
| 4,479,179 A | * | 10/1984 | Dinwiddie, Jr. .............. 710/25 |
| 4,688,168 A | | 8/1987 | Gudaitis et al. |
| 4,937,777 A | * | 6/1990 | Flood et al. ................. 710/107 |
| 4,942,571 A | | 7/1990 | Möller et al. |
| 4,964,040 A | * | 10/1990 | Wilcox ........................... 710/3 |
| 4,969,147 A | | 11/1990 | Markkula, Jr. et al. |
| 4,996,684 A | | 2/1991 | Morley et al. |
| 5,138,709 A | | 8/1992 | Jones et al. |
| 5,173,859 A | * | 12/1992 | Deering ........................ 701/70 |
| 5,223,806 A | | 6/1993 | Curtis et al. |
| 5,251,208 A | | 10/1993 | Canniff et al. |
| 5,274,783 A | | 12/1993 | House et al. |
| 5,291,614 A | * | 3/1994 | Baker et al. ................... 712/35 |
| 5,367,678 A | | 11/1994 | Lee et al. |
| 5,426,741 A | * | 6/1995 | Butts et al. .................... 710/18 |
| 5,437,060 A | | 7/1995 | Delamater et al. |
| 5,445,128 A | | 8/1995 | Letang et al. |
| 5,483,927 A | | 1/1996 | Letang et al. |
| 5,557,634 A | | 9/1996 | Balasubramanian et al. |
| 5,592,682 A | * | 1/1997 | Chejlava et al. ................ 710/3 |
| 5,615,404 A | | 3/1997 | Knoll et al. |
| 5,623,610 A | * | 4/1997 | Knoll et al. ................. 710/300 |
| 5,625,821 A | * | 4/1997 | Record et al. ............... 718/100 |
| 5,652,839 A | * | 7/1997 | Giorgio et al. ............. 709/224 |
| 5,694,555 A | | 12/1997 | Morriss et al. |
| 5,708,817 A | * | 1/1998 | Ng et al. ..................... 710/266 |
| 5,737,356 A | | 4/1998 | Harrison et al. |
| 5,740,467 A | * | 4/1998 | Chmielecki et al. .......... 710/56 |
| 5,742,847 A | | 4/1998 | Knoll et al. |
| 5,754,780 A | | 5/1998 | Asakawa et al. |
| 5,801,602 A | | 9/1998 | Fawal et al. |
| 5,809,027 A | | 9/1998 | Kim et al. |
| 5,815,516 A | | 9/1998 | Aaker et al. |
| 5,907,689 A | * | 5/1999 | Tavallaei et al. ............ 710/110 |
| 5,909,556 A | | 6/1999 | Morriss et al. |
| 5,946,215 A | | 8/1999 | Mito |
| 5,978,875 A | * | 11/1999 | Asano et al. ................ 710/107 |
| 6,013,108 A | | 1/2000 | Karolys et al. |
| 6,043,734 A | * | 3/2000 | Mueller et al. ............. 340/429 |
| 6,115,713 A | | 9/2000 | Pascucci et al. |
| 6,122,693 A | * | 9/2000 | Gutta et al. .................. 710/107 |
| 6,134,485 A | | 10/2000 | Tanielian et al. |
| 6,134,676 A | * | 10/2000 | VanHuben et al. ........... 714/39 |
| 6,195,724 B1 | | 2/2001 | Stracovsky et al. |
| 6,205,509 B1 | * | 3/2001 | Platko et al. ................ 710/269 |
| 6,273,771 B1 | | 8/2001 | Buckley et al. |
| 6,452,938 B1 | | 9/2002 | Fawal et al. |
| 6,505,263 B1 | * | 1/2003 | Larson et al. ............... 710/100 |
| 6,556,817 B1 | * | 4/2003 | Souissi et al. ............... 455/406 |
| 6,559,775 B1 | * | 5/2003 | King ........................ 340/932.2 |
| 6,600,972 B2 | | 7/2003 | Morrison et al. |
| 6,658,515 B1 | * | 12/2003 | Larson et al. ............... 710/260 |
| 6,674,725 B2 | * | 1/2004 | Nabkel et al. ............... 370/252 |
| 6,724,772 B1 | * | 4/2004 | Borland et al. ............. 370/442 |
| 6,874,036 B2 | * | 3/2005 | Rawson, III ................ 709/246 |
| 6,879,820 B2 | * | 4/2005 | Bjelland et al. ............. 455/406 |
| 6,904,480 B1 | * | 6/2005 | Hobbs et al. ................ 710/107 |
| 6,970,081 B1 | * | 11/2005 | Cheng ......................... 340/541 |
| 6,983,339 B1 | * | 1/2006 | Rabe et al. .................. 710/260 |
| 7,047,003 B2 | * | 5/2006 | Sako et al. .................. 455/423 |
| 2004/0158616 A1 | * | 8/2004 | Ellerbrock et al. ......... 709/212 |

FOREIGN PATENT DOCUMENTS

| | | |
|---|---|---|
| EP | 0562333 A2 | 9/1993 |
| EP | 0877322 A2 | 11/1998 |
| WO | WO 99/63409 | 12/1999 |
| WO | WO 00/62501 A2 | 10/2000 |

OTHER PUBLICATIONS

COTS Technology Focus, MIL-STD-1553 Update: Library Approach Speeds FPGA-Based 1553 Design, COTS Journal 2003.—3 pages.*

Rapid-Prototyping of a CAN-Bus Controller: A Case Study, retrieved from http://ieeexplore.ieee.org/iel3/3756/10961/00506742.pdf?isnumber=10961&prod=CNF&arnumber=506742&arSt=146&ared=151&arAuthor=Kirschbaum%2C+A.%3B+Renner%2C+F.M.%3B+Wilmes%2C+A.%3B+Glesner%2C+M.—IEEE 1996—6 pages.*

Bosch: "CAN Specification version 2.0" 1991.

Supplementary European Search Report for European Application No. EP 02731535, completed on Jul. 13, 2006.

485 RS-Communication, <www.datadog.com>, 1998.

Young, Gregory, C Function Turns PC Into Serial-Bus Master, EDN Access, <http://edn.com/archives/1996/090296/18di5.htm>, Sep. 2, 1996.

INTERSIL, HD-15531: CMOS Manchester Encoder-Decoder, <http://www.intersil.com/data/fn/fn2961>, Mar. 1, 1997.

Encoding Dictionary, Terms, and Definitions, <http://www.interfacebus.com/definitions.html>, 2007.

European Search Report for EP01995467, completed on Oct. 1, 2004.

Lee, Kang, IEEE 1451: A Standard in Support of Smart Transducer Networking , 2000, IEEE.

IEEE Standard For A Smart Transducer Interface For Sensors And Actuators—Transducer To Microprocessor Communication Protocols And Transducer Electronic Data Sheet (TEDS) Formats , Sep. 25, 1998, 122 , IEEE Instrumentation and Measurement Society; IEEE Std 1451.2-1997; ISBN 1-55937-963-4.

RS-232 Definition, Wikipedia, <http://en.wikipedia.org/wiki/rs232>, 2007.

RS-485, <http://www.innovatic.dk/knowledg/rs485/rs485.Htm>, 2007.

Universal Asynchronous Receiver Transmitter Definition, Wikipedia, <http://en.wikipedia.org/wiki/uart>, 2007.

AN10250: Using A Philips 16C UART To Implement A Simple RS-485 Transmitter And Receiver Node, Aug. 20, 2004, Philips.

Patzke, Robert, Fieldbus Basics, Computer Standards & Interfaces 19, 1998, 275-293, Elsiver Sciences B.V.

Gotlib et al., Decoding Techniques In Coaxial-Cable-Based Local Area Networks, Automatic Control And Computer Sciences, 1989, 47-54, vol. 23, No. 2, Allerton Press, Inc.

INFINEON: *C167CR 16-BIT Single-Chip Microcontroller*; Apr. 2000; 72 pages; XP-002201995; Published by Infineon Technologies AG.

Tobias Wenzel; IFINEON: *CAN Baudrate Detection with Infineon CAN Devices*; Jul. 1999, 11 pages; XP-002201996.

PCT Notification of Transmittal of the International Search Report, PCT International Search Report for PCT/US02/13190 (filed Apr. 26, 2002).

PCT Notification of Transmittal of the International Search Report, PCT International Search Report for PCT/US02/13246 (filed Apr. 26, 2002).

PCT Notification of Transmittal of the International Search Report, PCT International Search Report for PCT/US02/13303 (Field Apr. 26, 2002).

PCT Notification of Transmittal of the International Search Report; PCT International Search Report for PCT/US02/13366, (filed Apr. 26, 2002).

PCT Notification of Transmittal of the International Search Report, PCT International Search Report for PCT/US02/13367 (Filed Apr. 26, 2002).

PCT Communication Relating to the Results of the Partial International Search for PCT/US/01/47393, (submitted: Oct. 21, 2003).

\* cited by examiner

SYSTEMS, METHODS, AND BUS CONTROLLERS FOR CREATING AN EVENT TRIGGER ON A NETWORK BUS

FIELD OF THE INVENTION

The present invention relates generally to controlling communication on a network bus and more specifically to creating an event trigger on a network bus indicating an event of interest has occurred.

BACKGROUND OF THE INVENTION

As systems, such as the multimedia entertainment, communications, process control, and diagnostic systems utilized by the automotive and aerospace industries, become more complex, a need arises for additional devices to communicate, either with each other or with a central controller or the like. Historically, these systems included dedicated wiring extending between the various devices in order to support communications therebetween. As systems have become more integrated and the communications requirements have been increased, the amount of dedicated wiring that would be required has become excessively large, both in terms of the space required for the wiring and the cost of the wiring and the attendant installation. Moreover, as the amount of dedicated wiring increases, the overall complexity of the system also generally increases, as well as the likelihood that some portion of the wiring might be damaged or broken during or following installation.

As such, network systems have been developed to provide a common communications path between a plurality of network devices. In automotive and aerospace applications, for example, a network system can be utilized to monitor various components and to collect diagnostic and status information. In this regard, diagnostic and status information relating to the strain, acceleration, pressure and/or temperature to which the various components are subjected may be collected and analyzed.

By way of further example, a network bus architecture is currently being developed to support communications and the delivery of multimedia information to the occupants of a vehicle, such as an automobile, minivan, sports utility vehicle, aircraft, boat or the like. Advantageously, this network bus would transport the audio signals, including streaming audio signals, produced by one or more of a radio, a cassette tape player, a compact disc player or the like to selected speakers or headphone jacks throughout the vehicle. Similarly, the network bus may support voice and data communications with a cellular telephone carried by an occupant of the vehicle, as well as communications with a laptop computer, a handheld computing device or the like. In addition, the network bus may transmit video signals, including streaming video signals, from a television receiver, a videocassette recorder or other video source to one or more video monitors. In addition, the network bus may transmit sensor and actuator signals to and from devices such as drivetrain devices, passive restraint devices, crash avoidance devices, drive-by-wire devices, or the like. Further, the network bus system may transport information related to diagnostic performance of the vehicle.

In addition to the variety of devices that are connected to a network bus, one or more controllers are also generally connected to the network bus for sending commands to the various remote devices and receiving data from the remote devices. Among other things, these commands specify the manner in which the various devices are to function including the manner in which the various devices are to transmit information over the network bus.

Traditionally, networks of the type described above have transmitted data in analog format. Unfortunately, analog signals are susceptible to noise introduced into the signals during data transmission. Given that many of the transmitted signals have a low amplitude to start with, this noise can corrupt the signal and decrease the signal to noise ratio to levels that cause loss of resolution in the signal. Further, as many of these network devices are scattered some distance from the controller, the electrical lines connecting the network devices to the controller may be sufficiently long to cause signal degradation due to DC resistance in the wiring.

In light of these shortcomings, it would be advantageous to utilize digital networks. But, many conventional digital networks suffer from a variety of problems themselves. For example, many existing digital networks operate according to complicated protocols which require each network device to have a relatively high level processor, thereby increasing the cost of the network devices. Complicated protocols also introduce overhead into the messages on the bus that are not necessary for data acquisition and control. This overhead can severely limit the number of data samples that can be transmitted on the bus. These networks also have other problems. For example, they generally do not support both acquisition and control, and they typically only support networks that extend over relatively short lengths. Further, these networks typically have bulky network device interfaces, slow network data rates and/or a low network device count. Additionally, many computer systems that include digital networks do not operate in a time-deterministic manner. As such, these computer systems generally lack the capability to schedule a trigger on event command to the network components that repeats or is interpreted and executed with any precision timing.

Further, some conventional network systems operate in a master/slave configuration, where the bus controller controls all communication on the network bus. In these network systems, the bus controller uses an operation schedule, (sometimes referred to as a command schedule), that includes commands related to either one or a group of network devices and the timing for communicating with the network devices. As such, the bus controller mandates all or substantially all timing for communications.

Although placing the bus controller in control of all communications on the network bus is advantageous as it eliminates communication conflicts on the network bus, there may be some drawbacks to this configuration. Specifically, in some instances, timing for sending commands to various network devices on the network is dictated by an event of interest in a process with which the network system is associated. For example, in many data acquisition and control systems, it is typically desirable to acquire data or perform actions with accurate timing and control. In these systems, it is crucial or at least beneficial to synchronize commands sent by the controller to the network devices with the occurrence of an event of interest of a process to which the network system is associated.

As an example, in regard to automobiles, it may be advantageous to provide a network system that, among other things, maintains precise engine control. In this example system, knowledge of the rotation of the crankshaft of the engine may be a critical factor for data acquisition and control. The rotation of the crankshaft may be referenced according to a once per revolution mark referred to as a top dead center (TDC) position In this system, to accurately acquire data and control the performance of the engine, the TDC position should be used to synchronize commands from the bus controller to various network devices associated with controlling the engine.

To synchronize the bus controller with an event of interest, some conventional network systems include a sensor or similar device connected to the process for providing an indication to the bus controller when the event has occurred. (In the above-mentioned example, the network may include a sensor that detects each time a reference point on the crankshaft is at the TDC position.). However, because communications on the network bus are controlled by the bus controller and because it is not predeterminable beforehand when the event will occur, the sensor is not part of the network system. Instead, it is connected to the bus controller by a separate, dedicated line, so that when it transmits an indication that the event of interest has occurred, it will not disrupt communication on the network bus.

As stated above, however, an important advantage of network systems is the replacement of dedicated wiring with a common network bus. The requirement of the additional dedicated wiring by the above-described conventional network system is not consistent with this goal and suffers from problems, such as added cost of the wiring and the attendant installation, as well as the likelihood that some portion of the wiring might be damaged or broken during or following installation.

SUMMARY OF THE INVENTION

As set forth below, the present invention provides systems, methods, and bus controllers for monitoring an event of interest via a network bus and creating an asynchronous event trigger on the network bus indicating that the event occurred Importantly, the systems, methods, and bus controllers of the present invention use either one or several network devices that are connected to the network bus and monitor the occurrence of an event of interest. These network devices are configured through commands from the bus controller to indicate on the network bus, typically by a pulse signal, when the event of interest has occurred The indication from the network device that the event has occurred can then be used by the bus controller and other network devices on the network bus to configure timing for commands or to perform desired actions. The indication of the event by the network device is asynchronous in that it occurs irrespective of the operation schedule used by the bus controller for controlling communications on the network bus.

More specifically, in one embodiment, the system of the present invention includes a bus controller for controlling communication on a network bus and at least one first network device for determining when an event of interest has occurred. The event of interest may be any particular event to which timing of communications on the network bus should be synchronized. Importantly, the first network device is connected to the network bus and communicates with the bus controller of the present invention, as opposed to many conventional network systems that use dedicated wiring.

During operation, the bus controller of the present invention transmits an event command to the first network device instructing the first network device to provide an indication on the network bus when the event of interest has occurred. The event command instructs the first network device to indicate on the bus in an asynchronous fashion independent of the operation schedule used by the bus controller for communication. After receiving the event command, the first network device is in a ready state waiting for the event to occur. When the event occurs, the first network device provides an indication on the network bus independent of the communications on the network bus being currently controlled by the bus controller.

In some embodiments of the present invention, the occurrence of the event is used as a trigger on event command in the network system. Specifically, in some embodiments, the network system of the present invention may further include a second network device or a plurality of second network devices connected to the network bus for performing an associated action based on when the event of interest occurs For example, the second network device may be a sensor for acquiring data when the event of interest occurs, or it may be an actuator for performing a function.

In one embodiment of the present invention, it is desired that the second network device perform its associated action immediately on indication that the event of interest has occurred. As such, in this embodiment, the bus controller of the present invention transmits a trigger on event command that causes the first network device to indicate when the event has occurred. Further, the second network device(s) may be configured to respond to the trigger on event command and perform the associated action when the first network device indicates on the network bus that the event of interest has occurred.

In this embodiment, the first network device is preset by the bus controller to determine when the event occurs, and the second network device is preset to take action when it is indicated that the event occurred. This is advantageous as it allows the second network device to perform it associated action substantially simultaneous with the occurrence of the event.

In a further embodiment, the second network device may be configured to perform an associated action a selected delay time after the event of interest occurs. In this embodiment, either the bus controller sends the selected delay time along with the trigger on event command or the selected delay time is prestored in the second network device. In this instance, after the first network device has indicated that the event of interest has occurred, the second network device waits the selected delay time and then performs the action.

In an alternative embodiment, the bus controller of the present invention does not send a trigger on event command to the second network device prior to the occurrence of the event of interest. Instead, the first network device of this embodiment of the present invention, after detecting that the event has occurred, transmits a command for the second network device(s) to perform the associated action.

As mentioned previously, in some instances, the bus controller of the present invention uses an operation schedule for scheduling commands to be sent to network devices on the network bus. In some embodiments of the present invention, the scheduling of the commands for at least some of the network devices is based on the occurrence of the event of interest. For example, if the second network device or devices are sensors for sensing information relating to a process following the occurrence of an event, the operation schedule will include commands with associated timing for commanding the second network devices to perform the associated action following the indication of the occurrence of the event. In this embodiment, when the bus controller receives an indication from the first network device that the event of interest has occurred, it updates the operation schedule, such that the timing for sending commands to the second network devices are synchronized with the event of interest.

As mentioned previously, the first network device of the present invention, unlike many conventional network systems, is connected to the network bus and communicates with the bus controller over the network bus. The bus controller of the present invention instructs the first network device to provide an asynchronous indication on the network bus when the event occurs, irrespective of the normal communications on the network bus as defined by the operation schedule. Commands from the bus controller, such as the event command, are transmitted across the network bus to the first network device, and indications concerning the event are transmitted by the first network device across the network bus. As such, dedicated wiring is not required for indicating to the bus controller that the event of interest has occurred.

DETAILED DESCRIPTION OF THE INVENTION

Figure 1:
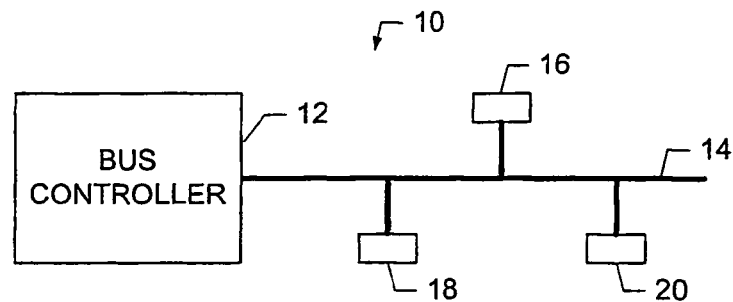
FIG. 1 is a block diagram of a general network system in which the systems, methods, and bus controllers of the present invention may be implemented.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As discussed briefly above and a greater detail below, the present invention provides systems, methods, and bus controllers for monitoring the occurrence of an event of interest via a network bus. Importantly, the systems, methods, and bus controllers of the present invention use either one or several network devices that are connected to the network bus and monitor the occurrence of an event of interest. These network devices are configured through commands from the bus controller to provide an asynchronous indication on the network bus, typically by a pulse signal and/or a more fault tolerant message response, that the event of interest has occurred. The indication from the network device that the event has occurred can then be used by the bus controller and other network devices on the network bus to configure timing for commands or to perform desired actions.

At the outset, it is important to note that the systems, methods, and bus controllers of the present invention may be implemented in any type of network system The network system may be resident in an aircraft, spacecraft, vehicle, building, factory, or any other packages, structures, or environment As examples, the systems, methods, and bus controllers of the present invention may be implemented in a network system resident on a rotary-wing aircraft, in which the network includes a plurality of sensors, actuators, etc. that are all connected to a common network bus for communication with a bus controller to determine performance, status, etc. concerning the various components of the aircraft. For example the network devices can include sensors for monitoring strain, acceleration and pressure of the aircraft's main rotor system.

The systems, methods, and bus controllers of the present invention may also be implemented in a network system in a vehicle such as an automobile in which the network system includes sensors and actuators connected to different components of the vehicle. For example, the network devices can include sensors for monitoring the throttle position, the oil pressure, the water temperature, the transmission fluid pressure, the seat position, the antilock brake system, the suspension, the passive restraint system and the steering system, to name but a few. Alternatively, the network devices may include an actuator for performing a particular function in response to a command from the bus controller. In the automotive application, for example, the network devices can include actuators for controlling the throttle position, the anti-lock brake system, the suspension, the passive restraint system and the active suspension system, to name but a few.

Still further, the network devices may include an audio or video source. In this regard, the network devices can include radio receivers, tape cassette players, compact disc players, cellular telephone receivers or other audio sources for providing audio signals, including, in some instances, streaming audio signals, to the network bus. Correspondingly, the network devices can include speakers, headphone jacks or the like for receiving audio signals from the network bus and for providing a corresponding audible output. Similarly, network devices can include a television receiver, a video cassette player or other video source for providing video signals, including streaming video signals, to the network bus. Accordingly, network devices can include a video monitor or the like for receiving the video signals and for displaying images based upon the video signals.

It is also understood that the present invention may be used in any particular protocol and network structure without departing from the invention In one advantageous embodiment, however, the systems, methods, and bus controllers of the present invention are implemented in the protocol and network structure described in U.S. patent application Ser. No. 09/735,146, entitled: Network Device Interface for Digitally Interfacing Data Channels to a Controller Via a Network filed on Dec. 12, 2000 and U.S. patent application Ser. No. 09/736,878, entitled: Network Controller for Digitally Controlling Remote Devices via a Common Bus filed on Dec. 14, 2000 both of which are incorporated herein by reference. This protocol and network structure offers many advantages over many conventional digital networks.

Specifically, as discussed previously, many existing digital networks operate according to complicated protocols which require each network device to have a relatively high level processor. This, in turn, may increase cost of the network devices. Further, the high level protocol may introduce overhead into the messages on the bus that can severely limit the number of data samples that can be transmitted on the bus. These networks also generally do not support both acquisition and control and they typically only support networks that extend over relatively short lengths. Further, these networks typically have bulky network device interfaces, slow network data rates and/or a low network device count. Additionally, many computer systems that include digital networks do not operate in a time-deterministic manner, and as such, lack the capability to schedule a trigger command to the network components that repeats or is interpreted and executed with any precision timing.

In light of these shortcomings with conventional digital network systems, the digital network structure and protocol of U.S. patent applications Ser. No. 09/735,146 and Ser. No. 09/736,878 use a low-level instruction set allowing less complicated devices to be implemented. The newly developed network system and protocol also allows for increased data rates and uses a command structure that allows for precision timing data acquisition or other actions on the network bus.

In one advantageous embodiment of the present invention, the functions of the present invention are added to the existing command structure of this network structure and protocol. In this embodiment, the system, methods, and functions of the present invention are implemented in the digital network structure and protocol of U.S. patent applications Ser. No. 09/35,146 and Ser. No. 09/736,878. Specifically, the commands described below may be implemented with the same structure as those of the protocol and the communication structure is the same. Importantly, the combination of the present invention with the structure and protocol of U.S. patent applications Ser. No. 09/735,146 and Ser. No. 09/736,878 provides a time-deterministic command structure for communication on the network bus, while also allowing for asynchronous triggering on the network bus for events of interest.

With reference to FIG. 1, a generalized network system in which the present invention may be implemented is illustrated. Specifically, FIG. 1 illustrates a common master/slave network system 10 having a host computer or bus controller 12, a network bus 14, and a number of network devices 16-20. In this configuration, the bus controller typically provides configuration and control of the network 10. Further, the individual network devices include assigned identifiers or addresses that uniquely define the network devices on the bus. In operation, the bus controller typically sends commands via the network bus to the network devices, along with the address of the network device or network devices that are supposed to follow the command. The network device or devices designated by the address sent with the command perform the actions associated with the command and may respond by placing data on the network bus to be sent to either the bus controller or another network device.

The bus controller typically uses an operation schedule, (sometimes referred to as a command schedule), that outlines the communications between the bus controller and the network devices. The operation schedule takes into account the sampling rates and other requirements of the devices and lists the commands and timing for commands to the various network devices to perform the desired operations of the network.

As discussed, some network systems are used in conjunction with processes having events of interest used by the network system for control of timing of commands. For example, network systems used with industrial processes, machine controls, etc. may all have events of interest associated with the process to which certain actions in the network system should be timed For example, in an industrial process the happening of an event in the process, such as the temperature or liquid reaching a certain level, etc., may require that certain actions be taken. These actions may include the taking of various readings, such as temperature and pressure readings, or may require actions, such as opening valves or removing a beat source. Further, in a mechanical control process, the rotation period of a shaft, movement of a lever past a certain point, etc. may require the control system to alter certain control mechanisms. Regardless of the process or the event of interest, the systems, methods, and bus controllers of the present invention may be used to monitor the event of interest via network bus. Importantly, the systems, methods, and bus controllers of the present invention create an asynchronous trigger on the bus instructing a sensor other network device monitoring the process to provide an indication on the network bus when an event of interest occurs.

Figure 2:
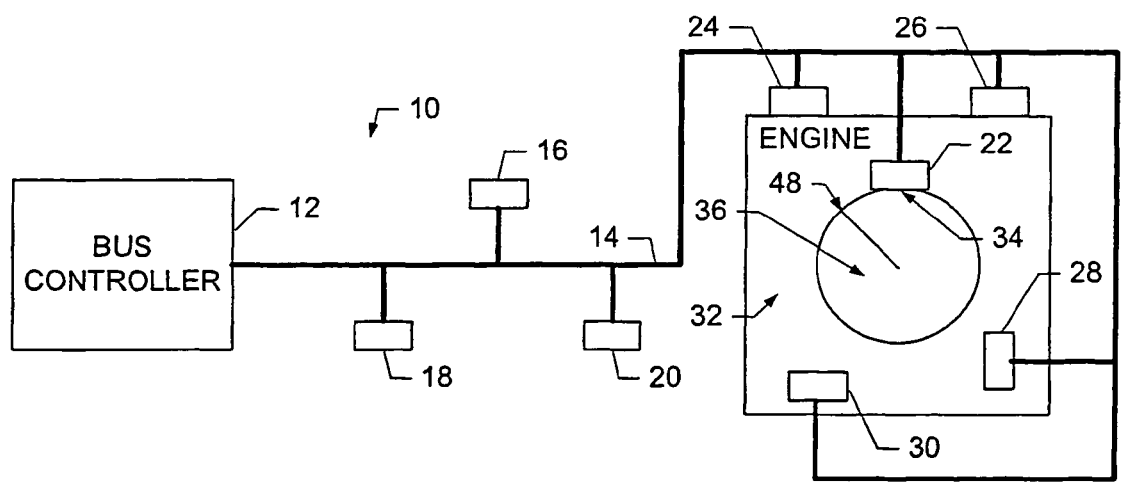
FIG. 2 is a block diagram of a network system in which systems, methods, and bus controllers of the present invention may be implemented, wherein the network system is in a vehicle in which portions of the network system are used to control a process in the vehicle, according to one embodiment of the present invention.

For example purposes, FIG. 2 illustrates the network system of FIG. 1 integrated into an automobile. The network system 10 of this embodiment, includes a bus controller 12 connected to a network bus 14 for controlling communications on the network bus. The network system further includes a plurality of network devices 16-20, such as sensors, actuators, multimedia devices, etc., for performing different functions on the automobile.

Importantly, the network system 10 further includes a plurality of second network devices 24-30 used to control the engine 32 performance of the vehicle. These network devices may include sensors for sensing information such as temperature of the engine, oxygen content in the intake, emissions, etc. The network devices may also include actuators for controlling the process, such as throttle positioning, air intake, etc. In this embodiment, the TDC position 34 of the crankshaft 36 of the engine 32 of the vehicle is used as a reference point for the control process. All or at least most control and data acquisition concerning the network devices 24-30 is referenced from the TDC position. As such, for the bus controller to properly command the second network devices 24-30 to control the engine performance, the bus controller must know when the crankshaft is at the TDC position.

In light of this, the system of this embodiment of the present invention further includes a first network device 22 or a plurality of first network devices that monitor the crankshaft of the engine. The first network device is connected to the network bus and is positioned to detect when a reference point 48 of the crankshaft reaches the TI)C position 34. The first network device is configured by the bus controller to provide an asynchronous trigger on the network bus indicating that the event has occurred so that the controller and the second network devices can perform actions in synchronization with the crankshaft. In other words, the first network device is instructed to transmit a signal on the network bus when the event happens and irrespective of the normal communications on the network bus, as defined by the operation schedule used by the bus controller.

Figure 3A:
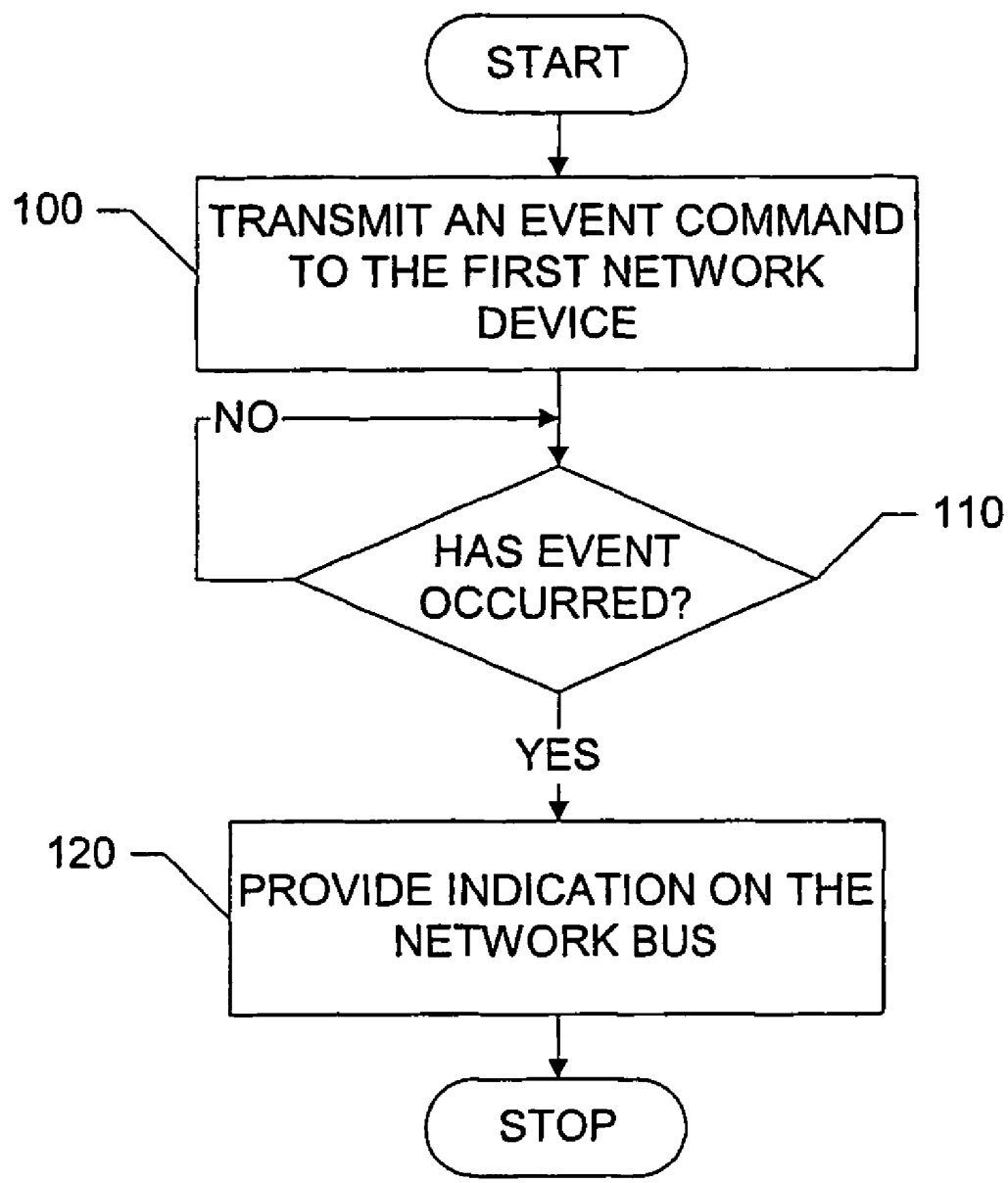
FIG. 3A is an operational block diagram illustrating the creation of an asynchronous event trigger on a network bus based on the occurrence of an event according to one embodiment of the present invention.
Figure 4:
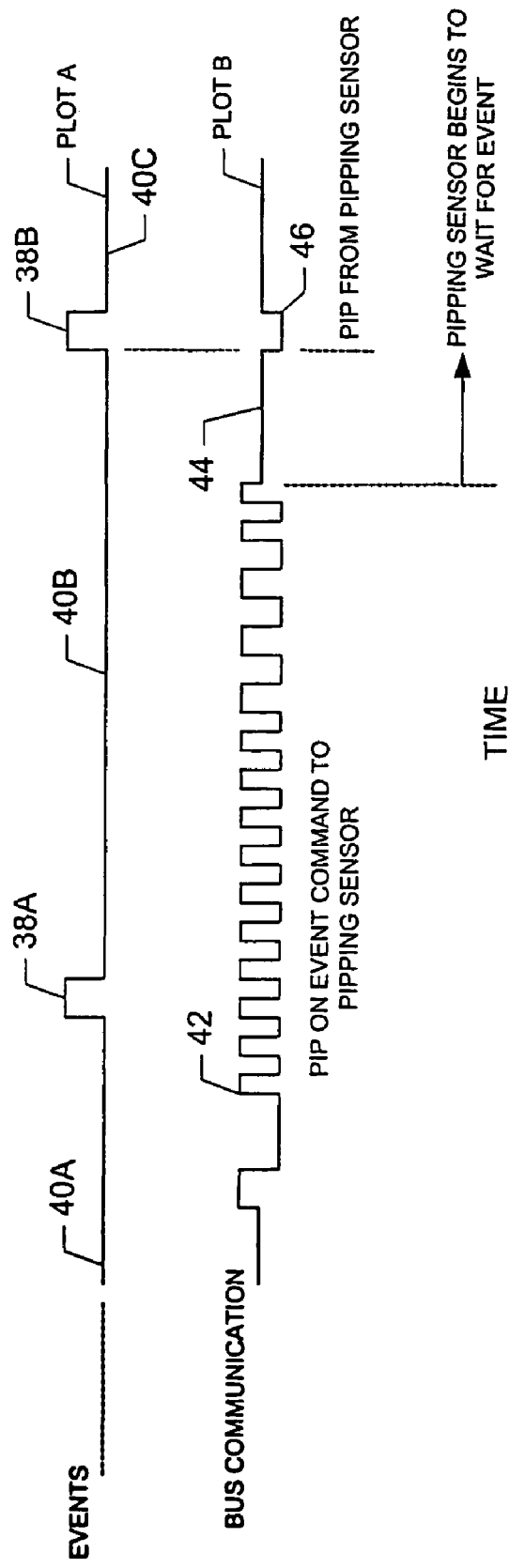
FIG. 4 is a graphical diagram illustrating the timing for occurrence of an event of interest and signal traffic in a network system to monitor and indicate when the event occurs according to one embodiment of the present invention.

FIG. 3A represents the operation of the system of the present invention according to one embodiment, and FIG. 4 illustrates the timing diagram for the event and the communications on the network bus. Specifically, with reference to FIG. 4, timing for the rotation of the crankshaft of the vehicle is illustrated as plot A. The timing includes event portions, 38A and 38B, indicating when the reference point 48 of the crankshaft is at the TDC position 32 and non-event portions 40A-40C when the crankshaft is at other points in its rotation.

With reference to FIG. 3A, to synchronize commands to the second network devices 24-30 with the rotation of the crankshaft, the bus controller 12 transmits an event command, (sometimes referred to as a Pip on Event command), to the first network device 22, (sometimes referred to in the art as the pipper). The event command instructs the first network device to provide an indication when the event of interest occurs, in this case, when the reference point 48 of the crankshaft is at the TDC position. (See step 100). With reference to FIG. 4, plot B illustrates communication on the network bus, with the data 42 representing the event command sent from the bus controller to the first network device.

The first network device 22 receives the event command and is configured to wait 44 for the next event to occur, (i.e., event 38B in FIG. 4). (See step 110). When the crankshaft cycles to the TDC position, (event 38B), the first network device senses the event. The first network device provides an indication 46 on the network bus that the event has occurred, typically, by sending a pulse or a message. (See step 120). As such, the bus controller 12 and second network devices 24-30 can synchronize with the rotation of the crankshaft.

With regard to FIG. 4, it will be noted that the first network device did not indicate the first occurrence of the crankshaft at TDC, (event 38A). This is because the first network device did not receive the event command 42 from the controller until after the event 38A occurred This illustrates that the bus controller can either command the first network device to provide an indication of the occurrence of the event only on time, at selected intervals, or on a continuous basis.

As discussed, in the illustrative embodiment, the second network devices are used to either sense information or to control certain aspects of the engine of the vehicle. In some instances, it may be critical for at least some of the second network devices to act substantially simultaneous with the event of interest. For example, in the above example, some of the second network devices may be sensors for measuring certain parameters of the engine when the crankshaft is at the TDC position. In this instance, it is advantageous to reduce the time delay between when the first network device indicates that the event of interest has occurred and when the second network devices are commanded to perform their associated action. In light of this, in one embodiment of the present, prior to the event of interest, the bus controller may issue a command (sometimes referred to as a "Trigger on Pip" command), which configures the first network device to wait for the next event to occur and prepares the second network devices that need to perform immediate action to act when the first network device indicates that the event of interest has occurred.

Figure 3B:
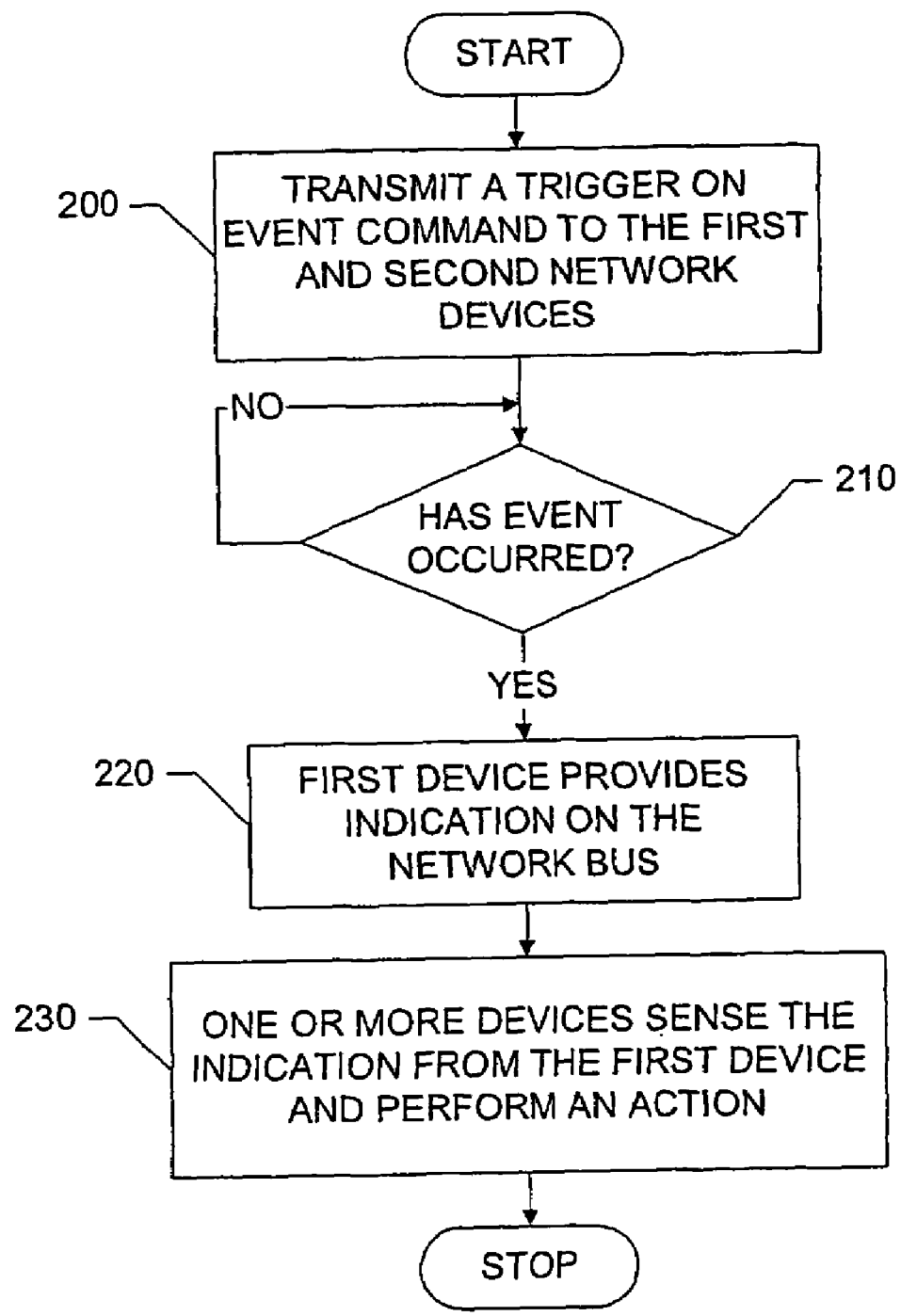
FIG. 3B is an operational block diagram illustrating the creation of an asynchronous event trigger on a network bus and performing action on the occurrence of the event according to one embodiment of the present invention.

Specifically, with reference to FIG. 3B, in this embodiment, to synchronize the second network devices requiring immediate action upon the occurrence of the event, the bus controller 12 transmits a trigger on event command to the first network device 22, instructing the first network device to provide an indication when the event of interest occurs. (See step 200). The trigger on event command also will trigger the second network devices requiring immediate action on the happening of the event. The trigger on event command, (sometimes referred to as the Trigger on Pip command), configures the second network devices to perform their associated action when the first network device indicates that the event has occurred.

After the first and second network devices have been configured, the first network device waits for the next event to occur, (i.e., event 38B in FIG. 4), and the second network devices that received the trigger on event command from the bus controller wait for the first network device to provide an indication on the network bus. When the reference point 48 of the crankshaft cycles to the TDC position, (event 38B), the first network device senses the event (See step 210). The first network device provides an indication 46 on the network bus that the event has occurred, typically, by sending a pulse. (See step 220). The second network devices sense the indication on the network bus and perform their associated action. (See step 230). As such, the second network devices can be synchronized to perform associated actions substantially simultaneous with the event of interest, (in this instance, the crankshaft at the TDC position).

In a further embodiment, the second network device may be configured to perform an associated action a selected delay time after the event of interest occurs. In this embodiment, either the bus controller sends the selected delay time along with the trigger on event command or the selected delay time is prestored in the second network device. In this instance, after the first network device has indicated that the event of interest has occurred, the second network device waits the selected delay time and then performs the action.

As mentioned previously, in some instances, the bus controller of the present invention uses an operation schedule for scheduling commands to be sent to network devices on the network bus. In some embodiments of the present invention, the scheduling of the commands for at least some of the network devices is based on the occurrence of the event of interest. For example, one of the second network devices may be a sensor that takes a number of samples during the time period defined between successive occurrences of the event of interest, (i.e., the time between the reference point of the crank-shaft being at the TDC position, non-events 40A-40C). In this instance, the operation schedule will include commands and timing for commanding the second network device to take the measurements where the start of these commands is referenced to the occurrence of the event.

To synchronize the second network devices to the crankshaft the bus controller of this embodiment of the present invention will, upon receiving the indication that the event has occurred, update the timing for the commands listed in the operation schedule. For example, if the second network device is designed to take eight (8) readings during the time period between events, the operation schedule will include commands end timing for controlling the second network device to take the readings. The bus controller will update the timing of these commands such that the readings take place after the event has occurred. Further, the bus controller may time the occurrences of events to determine the period of the crankshaft, (i.e., the time it takes the crankshaft to make one revolution). This calculated time period is used to determine the timing of each reading such that all readings are performed during the period of the crankshaft.

Figure 3C:
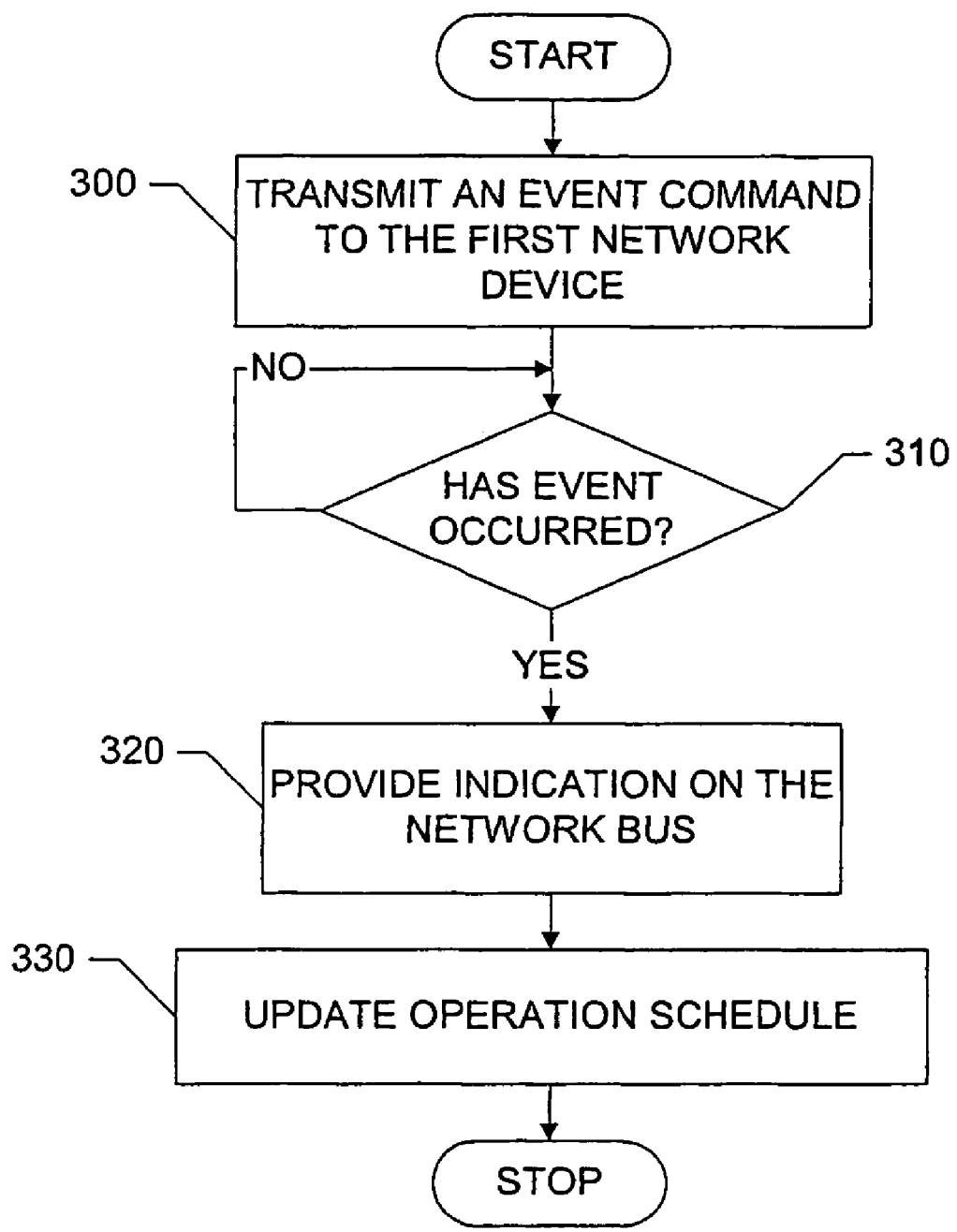
FIG. 3C is an operational block diagram illustrating the creation of an asynchronous event trigger on a network bus and updating an operation schedule used for controlling communications on the network bus according to one embodiment of the present invention.

With reference to FIG. 3C, in this embodiment, to update the operation schedule and synchronize the second network device with the crank-shaft, the bus controller 12 transmits an event command to the first network device 22, instructing the first network device to provide and indication when the event of interest occurs. (See step 300). The first network device receives the event command and waits for the event to occur. (See step 310).

When reference point of the crankshaft cycles to the TDC position, (event 38B), the first network device senses the event. The first network device provides an indication 46 on the network bus that the event has occurred. (See step 320). When the bus controller receives the indication, it updates it operation schedule to thereby synchronize commands sent to the second network devices with the crankshaft. (See step 330).

As illustrated above, the bus controller of the present invention typically commands a network device to indicate on the network bus when an event has occurred. However, in some instances, the bus controller itself, using the event command, may create a trigger on the network bus. Specifically, the bus controller may perform some internal process in which an event of interest in the process is used as a trigger for synchronizing some of the network devices connected to the network bus. In this embodiment, the bus controller transmits a trigger on event command to the network devices that are synchronizing to the event of interest. When the event of interest occurs in the internal process performed by the bus controller, the bus controller will indicate on the network bus that the event has occurred, and the selected second network devices will perform their associated actions.

As illustrated in the various embodiments above, the present invention provides systems, methods, and bus controllers for monitoring an event via a network bus and using the event to schedule communications on the network bus. Importantly, the systems, methods, and bus controllers of the present invention use the network bus, as opposed to dedicated wiring between, the bus controller and the first network device for monitoring the event Further, although the bus controller typically controls all communication on the network bus, the systems, methods, and bus controllers of the present invention instruct the first network device to provide an asynchronous indication on the network bus independent of the operation schedule used by the bus controller for communication.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for monitoring an event of interest via a network bus, wherein said system comprises:

a bus controller in electrical communication with the network bus for controlling communications on the network bus;

at least one first network device in electrical communication with the network bus for indicating that the event of interest has occurred, wherein said bus controller transmits an event command via the network bus commanding said first network device to indicate when the event of interest has occurred, and wherein said first network device, upon determining that the event has occurred, transmits an indication on the network bus, at least one second network device for performing an associated action based on when the event of interest occurred, wherein said bus controller transmits a trigger on event command via the network bus commanding said first network device to indicate on the network bus when the event of interest has occurred, and wherein the trigger on event command further commands said second network device to perform the associated action when said first network device indicates on the network bus that the event of interest has occurred.

2. A system according to claim 1, wherein said second network device performs the associated action a selected delay time after the event of interest has occurred, wherein when said first network device indicates that the event of interest has occurred, said second network device performs the associated action after the selected delay time.

3. A system for monitoring an event of interest via a network bus, wherein said system comprises:

a bus controller in electrical communication with the network bus for controlling communications on the network bus;

at least one first network device in electrical communication with the network bus for indicating that the event of interest has occurred, wherein said bus controller transmits an event command via the network bus commanding said first network device to indicate when the event of interest has occurred, and wherein said first network device, upon determining that the event has occurred, transmits an indication on the network bus, at least one second network device for performing an associated action, wherein said bus controller commands said second network device to perform the associated action based on when the event of interest occurs.

4. A system according to claim 3, wherein said bus controller communicates with said second network device based on an operation schedule outlining commands to be sent to said second network device and timing for sending the commands, wherein when said bus controller receives an indication from said first network device that the event of interest has occurred, said bus controller updates the operation schedule such that the timing for sending commands to said second network device are based on when the event of interest occurs.

5. A system according to claim 4, wherein the event of interest occurs on a periodic basis, wherein the operation schedule includes commands and timing used by said bus controller to command said second network device to perform the associated action at a specified time period defined between successive occurrences of the event of interest, and wherein when said bus controller receives an indication from said first network device that the event of interest has occurred, said bus controller updates the operation schedule such that the timing for sending commands to said second network device are based on when the event of interest occurs.

6. A system according to claim 3, wherein said bus controller communicates with all network devices based on an operation schedule that outlines all communication on the network bus, wherein when the event of interest occurs, said first network device transmits an indication on the network bus independent of the operation schedule.

7. A system according to claim 3, wherein said first network device transmits at least one of a pulse and a message on the network bus when the event of interest occurs.

8. A method for monitoring an event of interest via a network bus, wherein said method comprises the steps of:
transmitting an event command from a bus controller that controls communications on the network bus to at least a first network device via the network bus commanding the first network device to indicate when the event of interest has occurred;
determining via the first network device that the event of interest has occurred;
providing an indication on the network bus; and
performing an action via at least one second network device based on when the event of interest occurred, wherein said transmitting step transmits a trigger on event command from the bus controller via the network bus commanding the first network device to indicate when the event of interest has occurred, wherein the trigger on event command further commands the second network device second network device to perform the associated action when the indicating step indicates that the event of interest has occurred.

9. A method according to claim 8, wherein said performing step performs the associated action a selected delay time after the event of interest has occurred, wherein when said indicating step indicates that the event of interest has occurred, said performing step performs the associated action after the selected delay time.

10. A method for monitoring an event of interest via a network bus, wherein said method comprises the steps of:
transmitting an event command from a bus controller that controls communications on the network bus to at least a first network device via the network bus commanding the first network device to indicate when the event of interest has occurred;
determining via the first network device that the event of interest has occurred;
providing an indication on the network bus; and
performing an action via at least one second network device, wherein said transmitting step transmits a trigger on event command via the network bus commanding the second network device to perform the associated action based on when the event of interest occurs.

11. A method according to claim 10, wherein said transmitting step transmits commands to the second network device based on an operation schedule outlining commands to be sent to the second network device and timing for sending the commands, wherein said method further comprises the step of updating the operation schedule when said indicating step indicates that the event of interest has occurred, such that the timing for sending commands to the second network device are based on when the event of interest occurs.

12. A method according to claim 11, wherein the event of interest occurs on a periodic basis, wherein the operation schedule includes commands and timing used by said transmitting step to transmit commands to the second network device to perform the associated action at a specified time during a period defined between successive occurrences of the event of interest, and wherein said updating step updates the operation schedule when said indicating step indicates that the event of interest has occurred, such that the timing for sending commands to the second network device are based on when the event of interest occurs.

13. A method according to claim 10, wherein said transmitting step transmits commands to the second network device based on an operation schedule that outlines all communication on the network bus, wherein when the event of interest occurs, said indicating step provides an indication on the network bus independent of the operation schedule.

14. A method according to claim 10, wherein said indicating step provides at least one of a pulse and a message on the network bus when the event of interest occurs.

15. A bus controller for monitoring an event of interest via a network bus, wherein said bus controller is in electrical communication with the network bus and controls communications on the network bus, wherein said bus controller is capable of transmitting a trigger on event command via the network bus to at least one first network device connected to the network bus commanding that the network device indicate on the network bus when the event of interest has occurred, wherein the timing for the event to occur is unknown to the bus controller, wherein said bus controller is capable of receiving the indication from the first network device that the event of interest occurred, and wherein the trigger on event command further commands a second network device to perform an associated action when the first network device has indicated that the event of interest has occurred.

16. A bus controller according to claim 15, wherein said bus controller communicates with the second network device based on an operation schedule outlining commands to be sent to the second network device and timing for sending the commands, wherein when said bus controller receives an indication from the first network device that the event of interest has occurred, said bus controller updates the operation schedule such that the timing for sending commands to the second network device are based on when the event of interest occurs.

17. A bus controller according to claim 16, wherein the event of interest occurs on a periodic basis, wherein the operation schedule includes commands and timing used by said bus controller to command the second network device to perform the associated action at a specified time during the period defined between successive occurrences of the event of interest, and wherein when said bus controller receives an indication from the first network device that the event of interest has occurred, said bus controller updates the operation schedule such that the timing for sending commands to the second network device are based on when the event of interest occurs.

18. A system for monitoring an event of interest in a network system, wherein said system comprises:
a network bus for transporting all communications in the network system;
a bus controller in electrical communication with the network bus for controlling communications on the network bus;
at least one first network device in electrical communication with the network bus for indicating that the event of interest has occurred; and
at least one second network device in electrical communication with the network bus for performing an associated action based on when the event of interest has occurred, wherein said second network device is different from said first network device,
wherein said bus controller transmits an event command via the network bus commanding said first network device to indicate when the event of interest has occurred, wherein said first network device, upon determining that the event has occurred, transmits an indication on the network bus, and wherein said second network device receives an indication from said network bus that the event has occurred and performs the associated action based on when the event of interest occurred.

19. A system according to claim 18, wherein said bus controller transmits a trigger on event command via the network bus commanding said first network device to indicate when the event of interest has occurred, wherein the trigger on event command further commands said second network device to perform the associated action when said first network device indicates that the event of interest has occurred.

20. A system according to claim 18, wherein said bus controller communicates with said second network device based on an operation schedule outlining commands to be sent to said second network device and timing for sending the commands, wherein when said bus controller receives an indication from said first network device that the event of interest has occurred, said bus controller updates the operation schedule such that the timing for sending commands to said second network device are based on when the event of interest occurs.

21. A system according to claim 20, wherein the event of interest occurs on a periodic basis, wherein the operation schedule includes commands and timing used by said bus controller to command said second network device to perform the associated action at a specified time during the period defined between successive occurrences of the event of interest, and wherein when said bus controller receives an indication from said first network device that the event of interest has occurred, said bus controller updates the operation schedule such that the timing for sending commands to said second network device are based on when the event of interest occurs.

* * * * *